(12) United States Patent
Redetzke

(10) Patent No.: US 10,124,995 B2
(45) Date of Patent: Nov. 13, 2018

(54) TIMBERJACK

(71) Applicant: Northern Tool and Equipment Company, Inc., Burnsville, MN (US)

(72) Inventor: Robert Redetzke, Burnsville, MN (US)

(73) Assignee: Northern Tool and Equipment Company, Inc., Burnsville, MN (US)

( * ) Notice: Subject to any disclaimer, the term of this patent is extended or adjusted under 35 U.S.C. 154(b) by 0 days.

(21) Appl. No.: 14/328,182

(22) Filed: Jul. 10, 2014

(65) Prior Publication Data

US 2015/0014611 A1 Jan. 15, 2015

Related U.S. Application Data

(60) Provisional application No. 61/844,783, filed on Jul. 10, 2013.

(51) Int. Cl.
*B66F 3/00* (2006.01)
*B27B 17/00* (2006.01)
*B66F 15/00* (2006.01)
*B65G 7/12* (2006.01)

(52) U.S. Cl.
CPC .......... *B66F 3/005* (2013.01); *B27B 17/0075* (2013.01); *B65G 7/12* (2013.01); *B66F 15/00* (2013.01)

(58) Field of Classification Search
CPC ... B65G 7/00; B65G 7/02; B65G 7/08; B65G 7/10; B65G 7/12; B66F 15/00; B66F 19/005; B27B 17/0075
See application file for complete search history.

(56) References Cited

U.S. PATENT DOCUMENTS

| | | | |
|---|---|---|---|
| 265,135 A * | 9/1882 | Peabody | B65G 7/12 294/17 |
| 871,122 A | 11/1907 | Kingsley | |
| 1,134,581 A | 4/1915 | Barret | |
| 1,635,291 A * | 7/1927 | Smith | B65G 7/12 254/94 |
| 1,829,490 A * | 10/1931 | Parrish | B65G 7/12 294/17 |
| 2,162,668 A * | 6/1939 | Stocker | B27B 31/04 254/131 |
| 2,318,589 A * | 5/1943 | Barnette | B29C 45/14 16/110.1 |
| 2,439,122 A * | 4/1948 | Baker | B66F 15/00 254/131 |
| 2,539,231 A * | 1/1951 | Davis | B65G 7/12 254/131 |
| 2,718,375 A * | 9/1955 | Purdy | B27B 29/00 254/131 |
| 2,733,895 A * | 2/1956 | Trenkle | B27B 17/0075 254/131 |
| 2,788,237 A | 4/1957 | Misiura | |
| 2,929,609 A | 3/1960 | Graef | |

(Continued)

*Primary Examiner* — Tyrone V Hall, Jr.
(74) *Attorney, Agent, or Firm* — Fafinski Mark & Johnson, P.A.

(57) ABSTRACT

A timberjack including a handle, and a jacking stand coupled to the handle, the jacking stand comprising a first portion and a second portion, wherein the first portion is arranged to engage the ground, and wherein the second portion is coupled to the first portion and extends downwardly from the handle to elevate a portion of the handle from the ground.

6 Claims, 4 Drawing Sheets

(56) References Cited

U.S. PATENT DOCUMENTS

| | | | | |
|---|---|---|---|---|
| 4,087,077 | A | * | 5/1978 | Vance ................... B66F 15/00 |
| | | | | 254/94 |
| 4,221,416 | A | | 9/1980 | Piontkowski et al. |
| 4,258,907 | A | * | 3/1981 | Roberts ............... B27B 17/0075 |
| | | | | 269/287 |
| 4,368,874 | A | * | 1/1983 | Weisgerber ......... B27B 17/0075 |
| | | | | 254/131 |
| 4,433,829 | A | * | 2/1984 | Grover .................... B65G 7/12 |
| | | | | 254/131 |
| 4,449,743 | A | * | 5/1984 | Pankratz ................. B27B 29/00 |
| | | | | 294/103.1 |
| 4,533,117 | A | * | 8/1985 | Schwang ................ B66F 15/00 |
| | | | | 254/131 |
| 4,583,904 | A | * | 4/1986 | Maxwell ................... B62B 1/14 |
| | | | | 254/131 |
| 6,964,442 | B1 | * | 11/2005 | Radcliff ................. B27B 21/00 |
| | | | | 254/131 |
| 8,876,181 | B1 | * | 11/2014 | Roberts ................... B65G 7/12 |
| | | | | 254/131 |
| 2002/0063246 | A1 | * | 5/2002 | Bevre .................... B66F 15/00 |
| | | | | 254/131 |
| 2002/0166205 | A1 | * | 11/2002 | Rodriguez ............... A01B 1/00 |
| | | | | 16/110.1 |
| 2006/0087134 | A1 | * | 4/2006 | Hoff ........................ B65G 7/12 |
| | | | | 294/17 |

* cited by examiner

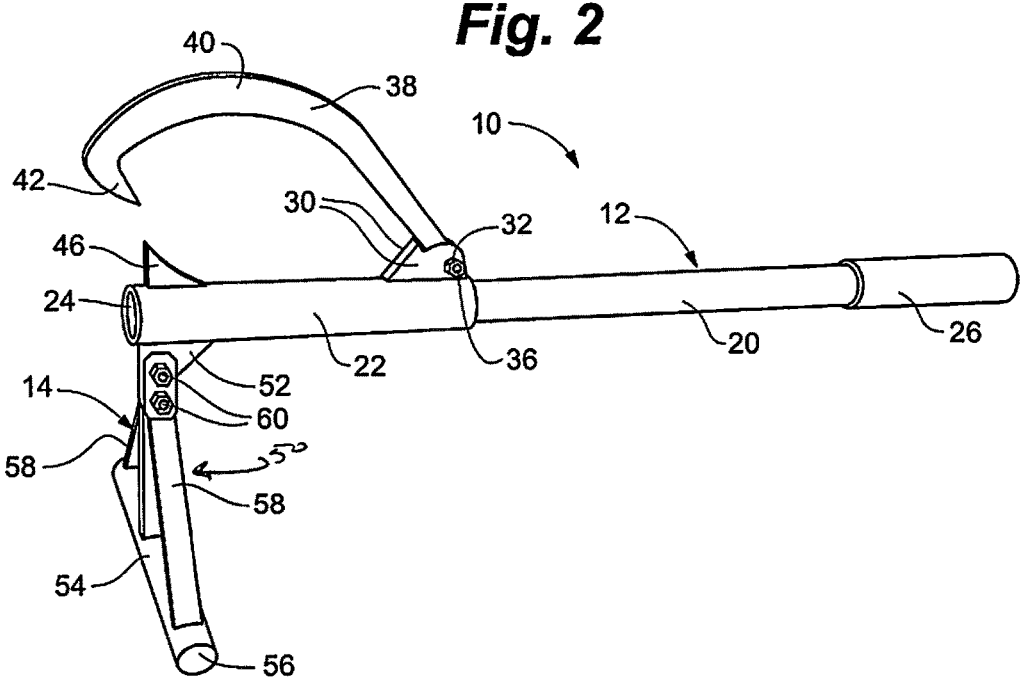
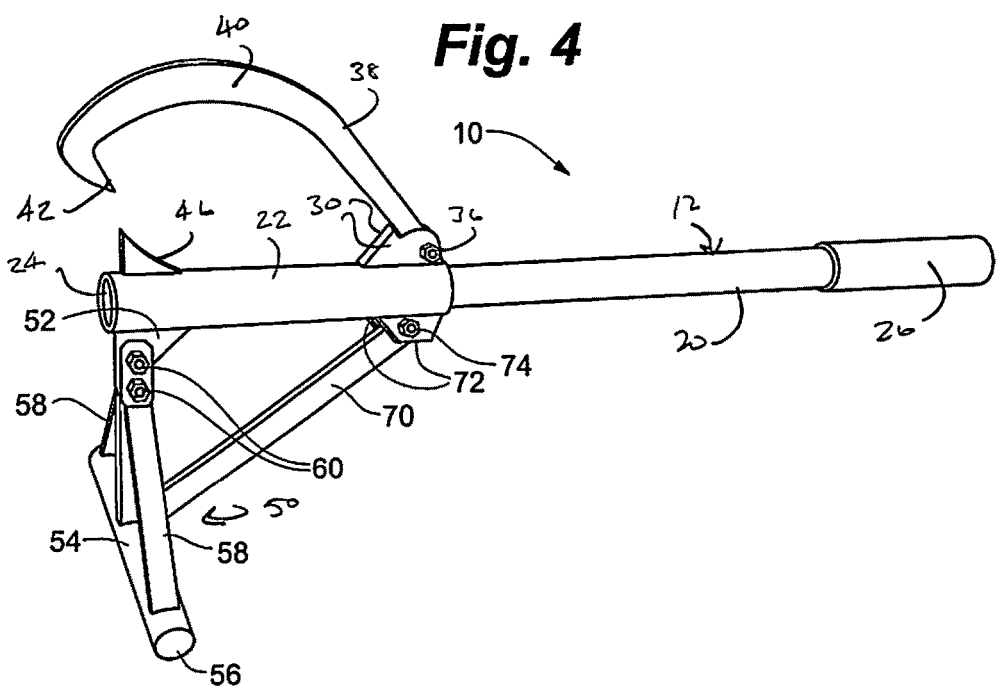

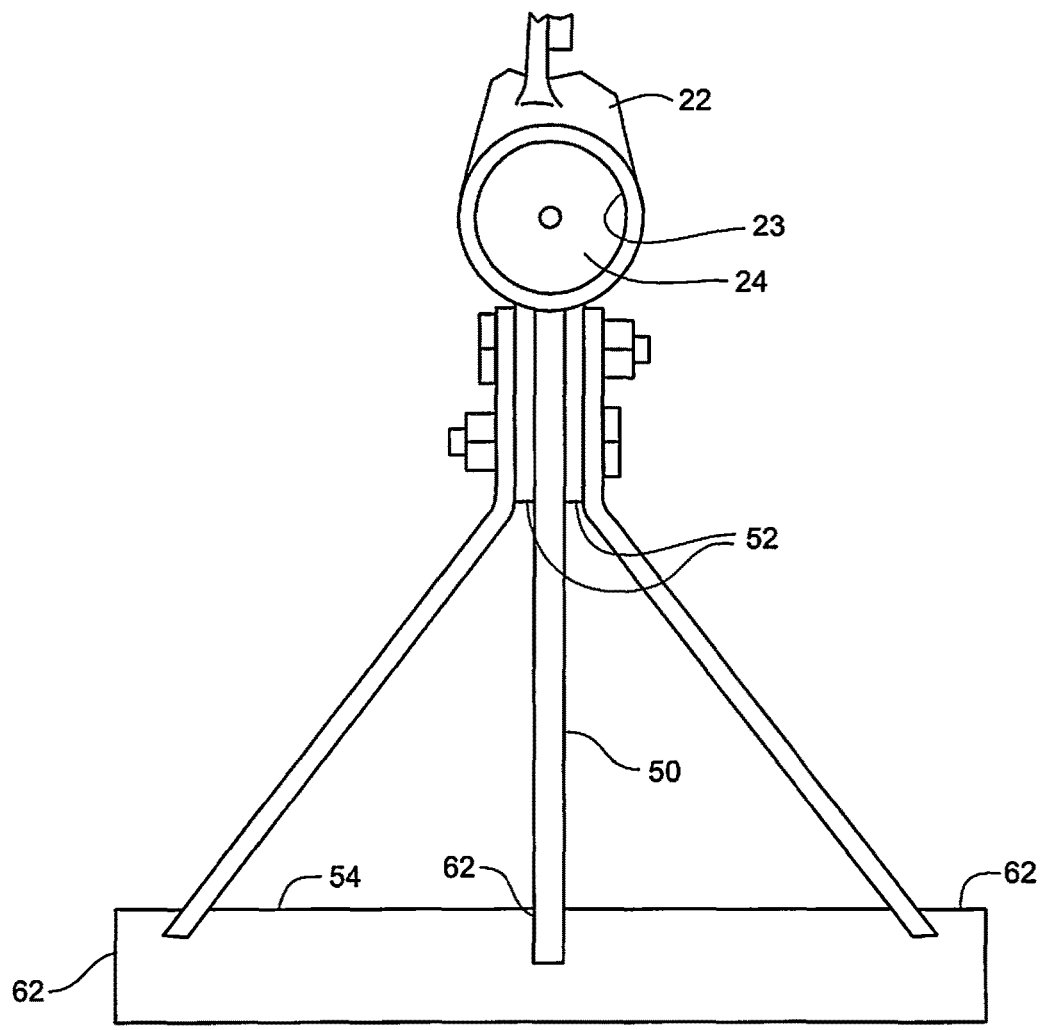

TIMBERJACK

RELATED APPLICATIONS

This application claims the benefit of U.S. Provisional Patent Application No. 61/844,783, filed Jul. 10, 2013, and hereby fully incorporated herein by reference.

TECHNICAL FIELD

The present invention relates to logging operations. More particularly, the present invention relates to manual handling of significantly sized logs.

BACKGROUND OF THE INVENTION

A timberjack is a hand tool typically used to elevate a significantly sized log and hold it in an elevated position to enable the log to be readily cut by means of a chainsaw or the like. As such, strength and stability of the timberjack are imperative. Strength because the operator has a significant moment arm as a result of the long handle. A human operator can engage and elevate a log of significant diameter and weight. Such operations require that the timberjack has great strength. Stability is required because once elevated, the log is resting on the handle of the timberjack and must remain safely in that disposition until the completion of the log cutting operations. Should the log shift significantly during cutting operations, it could present a danger to the operator of the saw or others standing nearby.

A prior art timberjack is shown generally at 80 in prior art FIG. 1. The timherjack 80 has a tubular handle 82. The tubular handle 82 is somewhat thin walled, having an axial aperture defined therethrough. Such tubular handle 82 does not exhibit the requisite strength needed for a timberjack used in the logging operations noted, above. Further, the prior art timberjack 80 has a single depending support 84. The single support 84 exhibits no lateral support at all. Additionally, the cross member 86 is relatively short, being less than eight inches in length. Such a relatively short length of the cross member 86 diminishes the needed stability of the timberjack 80 when supporting a log. Further, the ends 88 of the cross member 86 are open, admitting dirt and debris to an axial aperture defined in the cross member 86.

There is a need in the industry for a timberjack that addresses the problems noted above with respect to the prior art timberjack 80 and meets the needs noted above.

SUMMARY OF THE INVENTION

Embodiments of the present invention address the need in the industry for a timberjack that addresses the drawbacks noted above. A timberjack according to an embodiment of the invention generally includes a handle defining an aperture, a core member received in the aperture of the handle, and a hook operably coupled to and extending from the handle. The hook is configured to engage and receive a log through rotational movement of the handle. The timberjack further includes a jacking stand pivotally coupled to the handle, the jacking stand including at least one lateral member, a center member, and a cross-member. The at least one lateral member and the center member are perpendicularly affixed to the cross-member to form a frame of the jacking stand, and the frame of the jacking stand is configured to structurally support and elevate a log received by the hook.

In an embodiment, the handle includes a first sheath coupled to a second sheath to define a body of the handle. The first sheath may comprise a first material, and the second sheath a second, different, material. The first material may be fiberglass with the second material being steel. The handle may include a grip coupled to an end of the first sheath.

In an embodiment, a fixed point may be arranged at an end of the handle opposite the grip, wherein the fixed point is configured to engage a log on a surface opposite that of the hook through rotational movement of the handle. The cross-member of the jacking stand may be eight inches or more in length. The cross member of the jacking stand may comprise a generally tubular shape with closed ends. The core member may be made from steel material.

In another embodiment, a timberjack includes a handle defining an aperture, a core member received in the aperture of the handle, a hook operably coupled to and angularly extending from the handle, wherein the hook is configured to engage and receive a log through rotational movement of the handle, and a jacking stand pivotally coupled to the handle. The jacking stand includes at least three portions, the at least three portions comprising at least one lateral member, a center member, and a cross-member. The at least one lateral member and center member are perpendicularly affixed to the cross-member to form a frame of the jacking stand, and the frame of the jacking stand is configured to structurally support and elevate a log received by the hook. A trailing support is coupled to the jacking stand and the handle, wherein one end of the trailing support extends angularly upward from the jacking stand to a coupling mechanism formed on the handle, such that the trailing support provides additional structural support when a log is received by the hook.

In a further embodiment, a timberjack includes a handle, a hook pivotally coupled to and angularly extending from the handle at an intermediate point between a proximal and distal end of the handle, wherein the hook is configured to engage and receive a log through rotational movement of the handle, a pointed edge arranged at a distal end of the handle in an orientation generally opposed to the hook, wherein the pointed edge is spaced apart at a predefined distance from the hook and is configured to engage a log on a surface opposite that of the hook, and a jacking stand coupled to the handle, the jacking stand comprising a first portion and a second portion, wherein the first portion is arranged to engage the ground, and wherein the second portion is coupled to the first portion and extends downwardly from the handle to elevate a portion of the handle from the ground.

In a further embodiment, a timberjack includes a handle, and a jacking stand coupled to the handle, the jacking stand comprising a first portion and a second portion, wherein the first portion is arranged to engage the ground, and wherein the second portion is coupled to the first portion and extends downwardly from the handle to elevate a portion of the handle from the ground.

BRIEF DESCRIPTION OF THE DRAWINGS

The embodiments of the present invention may be more completely understood in consideration of the following detailed description of various embodiments in connection with the accompanying drawings, in which:

FIG. 2 is a side isometric view of a timberjack according to an embodiment of the present invention;

FIG. 3 is an end elevation view of the timberjack of FIG. 2;

FIG. 4 is a side isometric view of an alternative embodiment of a timberjack according to the present invention;

Figure 1:
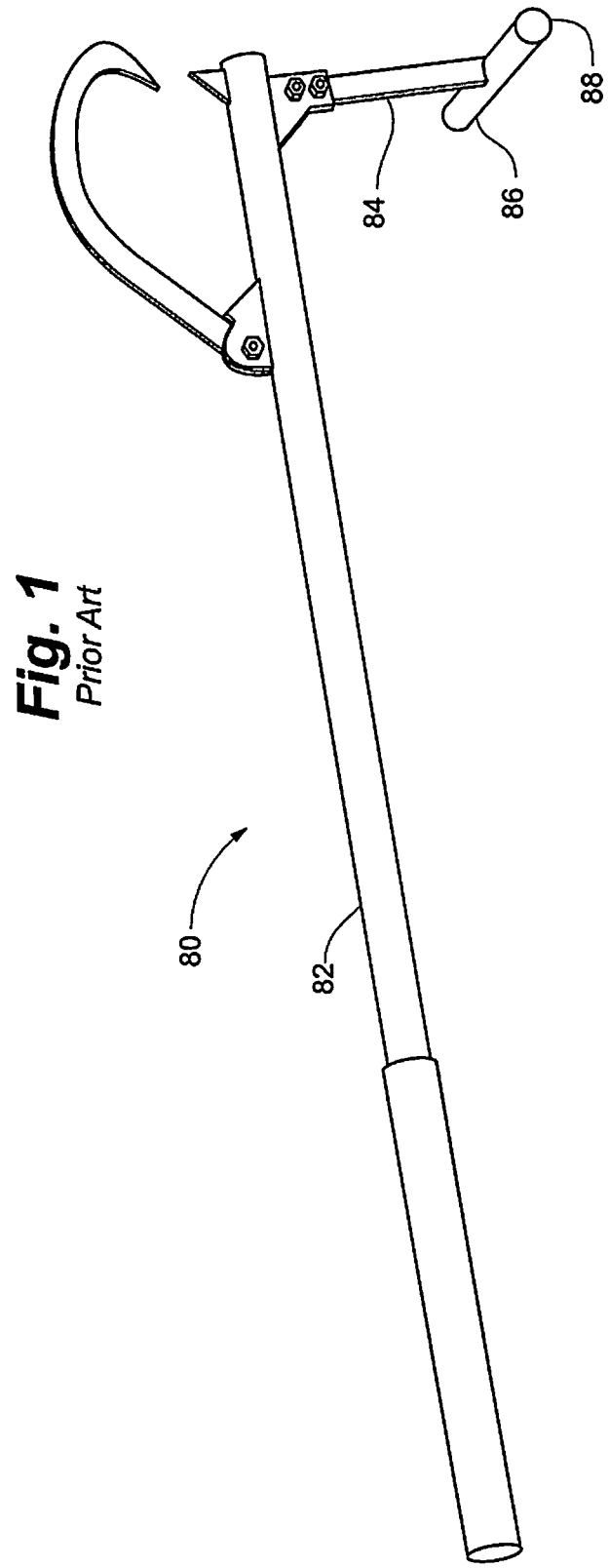
FIG. 1 is an isometric view of an exemplary prior art timberjack.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

As depicted in FIGS. 1-5, timberjack 10 according to embodiments of the invention generally includes handle member 12 and jacking stand 14. Referring to FIGS. 2 and 3, handle member 12 of timberjack 10 generally includes sheath 20, which may be made from fiberglass or other suitable material. The distal end of the fiberglass sheath 20 abuts a steel sheath 22. The overall strength of timberjack 10 is substantially increased by means of a solid steel core 24 that is disposed in an axial aperture defined in the fiberglass sheath 20. A suitable grip 26 adapted to enable comfortable gripping by an operator is disposed proximate the proximal end of the fiberglass sheath 20. Advantageously, grip 26 may be formed of a shock cushioning material such as neoprene or other synthetic rubber material.

Turning to the steel sheath 22, a pair of spaced apart ears 30 are affixed by a weldment to the upwardly directed side of steel sheath 22 (the side opposite jacking stand 14). Hinge coupling 32 is formed in ears 30 by means of bores (not shown) that are, in registry, defined in each of ears 30. The hinge coupling 32 shiftably couples hook 38 to the steel sheath 22. Hook 38 has a bore defined therethrough (not shown) that is placed in registry with the bores (not shown) of the hinge coupling 32 and hook 38 is affixed thereto with bolt 36.

Figure 5:
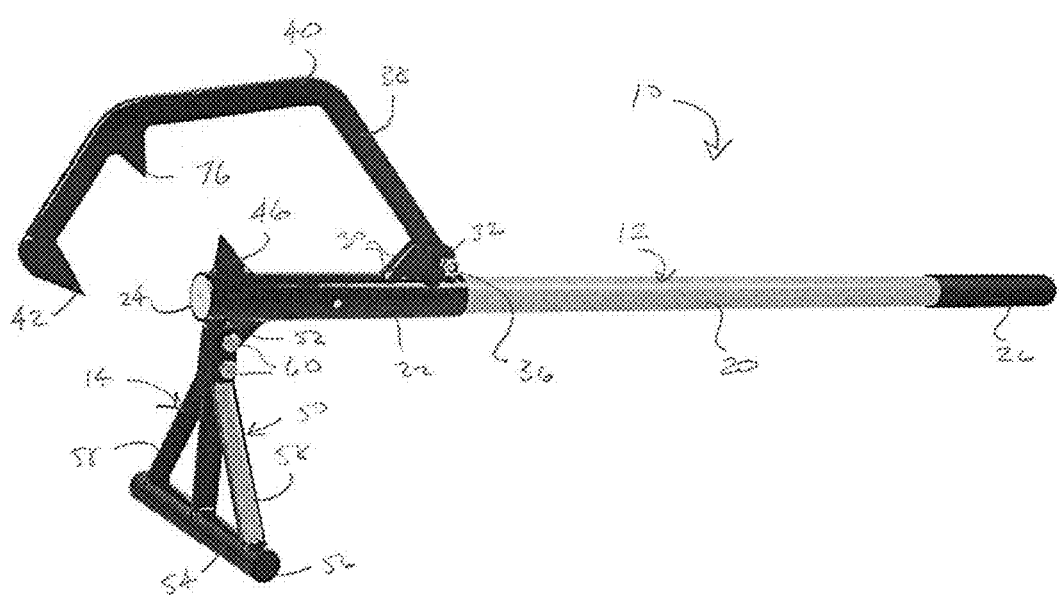
FIG. 5 is a side isometric view of another alternative embodiment of a timberjack according to the present invention.

Hook 38 has an arced hook shank 40 that terminates in hook point 42. Generally opposed to the hook, point 42 is fixed point 46. Fixed point 46 may be welded to, or formed integrally with, steel sheath 22. Hook point 42 is preferably formed integral with hook shank 40. In an alternative embodiment as depicted in FIG. 5, in order to enable handling of a wider range of different diameter logs, hook shank 40 may further include an intermediate hook point 76.

Jacking stand 14 of timberjack 10 generally includes center support 50. Center support 50 is removably coupled to steel sheath 22 by being captured between a pair of spaced apart ears 52. A pair of bolts 60 that pass through bores in registry (not shown) defined in center support 50 and through ears 52 removably couple center support 50 to steel sheath 22.

Transverse jacking cross member 54 is fixedly coupled at the distal end of center support 50. Preferably, cross member 54 is of tubular construction, having closed ends 56 to add strength and prevent debris from entering cross member 54.

A pair of lateral supports 58 extend at an angle from ears 52 to proximate the respective distal ends of cross-member 54. Lateral supports 58 are preferably fixedly attached to cross-member 54 by means of a weldment. The proximal ends of the respective lateral supports 58 each have a pair of bores (not shown) defined therein. The proximal ends of the respective lateral supports 58 are coupled to the exterior face of the respective ears 52 with bolts 60. It should be noted that the jacking cross-member 54 is preferably at least eight (8) inches in length in order to provide the desired stability of timberjack 10 when working with a log.

Turning to the embodiment of FIG. 4, timberjack 10 as depicted therein is identical to the timberjack 10 described above with reference to FIGS. 2 and 5, with the exception of an optional trailing support 70. A pair of spaced apart ears 72 are fixedly disposed on the underside of steel sheath 22 generally opposite to ears 52. Trailing support 70 is preferably formed of a steel bar having a bore (not shown) defined therein. The proximal end of trailing support 70 is captured on the outside margin of the respective ears 72 with bolt 74 received through bores (not depicted) defined in each of ears 72 and in trailing support 70. The distal end of trailing support 70 is preferably welded to cross-member 54.

In use, the distal end of the handle member 12 may be placed adjacent a log with handle member 12 in a generally vertical disposition. The shiftable hook 38 is placed around the circumference of a log. Rotating the handle member 12 toward the ground causes fixed point 46 and generally opposed hook point 42 to bite into the log, thereby capturing the log. Further such rotation acts to force the jacking stand 14 under the log, thereby elevating the log into a disposition suitable for cutting thereof.

Further, jacking stand 14 may be removed from handle member 12 by removing bolts 60 (and bolt 74 in the case of the second embodiment as depicted in FIG. 4). In such configuration, timberjack 10 can be utilized as a cant hook.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. § 112(f) are not to be invoked unless the specific terms "means for" or "step for" are recited in a claim.

The invention claimed is:

1. A timberjack comprising:
   a handle defining a first end, a second end and including:
   a steel sheath disposed proximate the first end of the handle and defining a first axial end, a second axial end opposite the first axial end, and a first axial aperture with a solid linear core disposed therein;
   a grip disposed proximate the second end of the handle;
   an exposed fiberglass sheath disposed defining a third axial end, a fourth axial end opposite the third axial end, and a second axial aperture with the solid linear core disposed therein, wherein the third axial end of the fiberglass sheath abuts the second axial end of the steel sheath and the fourth axial end of the fiberglass sheath abuts the grip, and wherein the steel sheath, fiberglass sheath and grip are linearly aligned along a plane of the handle;

a hook operatively coupled to and extending from the handle, wherein the hook is configured to engage and receive a log through rotational movement of the handle; and a jacking stand coupled to the handle, the jacking stand comprising at least two members arranged such that the jacking stand is configured to structurally support and elevate a log received by the hook.

2. The timberjack of claim 1, wherein the jacking stand further comprises at least three members including a center member, a cross-member and a lateral member and the jacking stand is configured to provide leverage for pivoting the handle about the cross-member.

3. The timberjack of claim 2, wherein the center member, the cross-member and the lateral member are arranged in the same plane that is a different plane than the plane of the handle.

4. The timberjack of claim 2, wherein the lateral member forms a first acute angle with the center member and a second acute angle with the cross-member and the first acute angle is different than the second acute angle.

5. The timberjack of claim 2, further comprising an ear attached to the underside of the steel sheath and the jacking stand is attached to the ear and extends at a right angle from the handle.

6. The timberjack of claim 5, further comprising an ear attached to the top side of the steel sheath that is configured to provide a hinge coupling for the hook.

* * * * *